United States Patent [19]

Della Valle et al.

[11] Patent Number: 5,332,809

[45] Date of Patent: Jul. 26, 1994

[54] PARTIAL ESTERS OF GELLAN

[75] Inventors: Francesco Della Valle, Padova; Vittorio Crescenzi, Rome; Lanfranco Callegaro, Ponte di Brenta, all of Italy

[73] Assignee: Fidia S.p.A., Abano Terme, Italy

[21] Appl. No.: 833,517

[22] Filed: Feb. 11, 1992

[51] Int. Cl.$^5$ .............................................. C07H 13/02
[52] U.S. Cl. .................... 536/119; 536/18.7; 536/115; 426/658; 424/401; 424/443; 424/488; 424/500
[58] Field of Search ............... 536/18.2, 115, 119, 536/123; 514/23, 54; 426/658; 424/401, 443, 488, 560

[56] References Cited

U.S. PATENT DOCUMENTS

| | | | |
|---|---|---|---|
| 4,326,053 | 4/1982 | Kang et al. | 536/123 |
| 4,851,521 | 7/1989 | Della Valle et al. | 536/55.1 |
| 5,147,861 | 9/1992 | Della Valle et al. | 514/54 |

FOREIGN PATENT DOCUMENTS

| | | |
|---|---|---|
| 0012552 | 6/1980 | European Pat. Off. |
| 0251905 | 1/1988 | European Pat. Off. |
| 0398313 | 11/1990 | European Pat. Off. |

OTHER PUBLICATIONS

Jansson et al.; Carb. Res. 156:165-172 (1986).
Kuo et al.,; Carb. Res. 156:173-187 (1986).
Della Valle et al.; Chemical Abstracts 110:135651y (1989).
Vilan: Chemical Abstracts 114:254024p (1991).
Yamato; Chemical Abstracts 115:214898r (1991).
Patent Abstracts of Japan, vol. 16, No. 86 (C-916) (5129).
"Quantitative Organic Analysis via Functional Groups", Fourth Ed., S. Siggia, Ph.D. & J. Gordon Hanna.
D. H. Slatter et al. Australian Veterinary Journal, vol. 59, Sep. 1982, pp. 69-72.

Primary Examiner—Johnnie R. Brown
Assistant Examiner—Kathleen Kahler Fonda
Attorney, Agent, or Firm—Birch, Stewart, Kolasch & Birch

[57] ABSTRACT

The present invention is directed to total and partial esters of gellan in which the esterifying alcohol component is derived from aliphatic, araliphatic, cycloaliphatic or heterocyclic alcohols, and salts of said partial esters with inorganic or organic bases, and compositions containing the same.

3 Claims, No Drawings

PARTIAL ESTERS OF GELLAN

FIELD OF THE INVENTION

The invention is directed to the esters of gellan in which all or only some carboxylic groups of the gellan are esterified and pharmacologically acceptable salts of the partial esters with metals or organic bases.

The compounds have useful and valuable gelling, bioplastic and pharmaceutical properties and the invention is also directed to methods of using and treating by administering to a host in need thereof, an effective amount of the gellan ester of the present invention. The gellan esters are also useful in numerous other fields, such as cosmetics, surgery, and in the food industry as foodstuffs. The invention also includes pharmaceutical preparations containing as an active ingredient one or more esters of gellan or one of their salts as defined above.

The invention is also directed to medicaments containing:
1) total and partial esters of gellan which by themselves are pharmacologically active substances, or an association of pharmacologically active substances; and
2) a vehicle comprising total or partial ester of gellan.

BACKGROUND AND RELATED ART

Gellan is an exocellular microbial polysaccharide, produced from Pseudomonas elodea cell lines and composed of repeating tetrasaccharide units of the following structure:

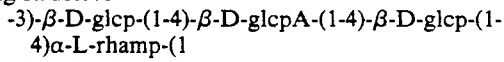

-3)-β-D-glcp-(1-4)-β-D-glcpA-(1-4)-β-D-glcp-(1-4)α-L-rhamp-(1 wherein glcp corresponds to glucose; glcpA corresponds to D-glucuronic acid; and rhamp corresponds to rhamnose. In its natural form, gellan contains an O-acetyl group in position C(6) of the first glcp residue and O-glyceric groups in position C(2) of the same residue. Natural gellan forms viscous solutions which can give fragile and thermolabile gels after salt addition, especially salts of bivalent cations such as $Ca2+$ and $Mg2+$.

Deacylation of natural gellan gives a better gelling agent ("Gerlite"), currently sold for formulations in the alimentary field. In the presence of aqueous solutions of $MgCl_2$ or $CaCl_2$ (approximately 0.1% w/v in salt and 0.8-1% w/v in polysaccharide) Gerlite forms highly resistant gels, which are stable when treated in an autoclave and are thermoreversible. They are chemically inert and generally resistant to enzymatic degradation. Gellan is used industrially for its biocompatibility and for the above mentioned special properties. The latter, moreover, according to the results of detailed physico-chemical investigations, markedly depend on the charge density and hydration of the polysaccharide chains as well as on the nature of the counterions. It is therefore to be expected that alteration of the above said critical parameters by partial esterification of the carboxylic groups along gellan chains will markedly influence the physico-chemical behavior of the derivatives (esters) both in bulk and in solution. Similarly, it is to be expected that nature and extent of the interactions between said derivatives and various synthetic and natural species, including proteins, will be profoundly influenced primarily by the chemical nature of the ester moieties and the degree of esterification.

For the preparation of gellan esters with industrial potential, it is important that the esterification procedure be mild, avoiding as much chain degradation as possible, and easily controllable in terms of both the final degree of esterification and yield.

A simple and convenient procedure fulfilling the above requirements encompassed by the present invention, has now been discovered for the preparation of gellan esters based on the treatment of quaternary ammonium salts of gellan with conventional alkylating agents in organic solvents, preferably aprotic, such as methylsulfoxide. The procedure allows the obtainment of a large variety of gellan esters, including mixed esters, above all the esters of monovalent n-aliphatic alcohols and the esters of arylaliphatic, alicyclic and heterocyclic monovalent alcohols.

The procedure also allows the esterification of gellan with appropriate divalent alcohols yielding, in function of the experimental conditions, insoluble derivatives cross-linked to different extents.

The central object of the invention is, however, the new derivatives of gellan in which the uronate residues along the polysaccharide chains are esterified with monovalent alcohols, derivatives which are soluble in water or in organic solvents, and the procedure for their preparation.

SUMMARY OF THE INVENTION

The central object of the invention is however the new total and partial esters of gellan, and a process for their preparation.

The invention is also directed to the use of said esters of gellan in the food, paper, textile, cosmetic and pharmaceutical industries, in medicine and surgery, and in the restoration of works of art; and it, therefore, includes also new articles based on the esters of gellan for use in these various industrial sectors, for example foodstuffs, cosmetic articles, pharmaceutical preparations, biodegradable plastic materials for use in medicine and surgery. The new esters according to the invention include total and partial esters of gellan. In the partial esters the non-esterified carboxyl groups can be salified with metals or organic bases, and these salts are part of the invention, as are the industrial articles which contain them.

The total and partial esters of gellan can be used in various industrial sectors, such as in the pharmaceutical, sanitary-surgical, cosmetic and alimentary sectors, where gellan is already used in its deacetylated form. Also part of the invention is the use of the esters in industrial articles and products, such as cosmetic, sanitary, surgical, pharmaceutical products, or foodstuffs and their additives, especially emulsifying agents, emulsion stabilizers, thickening agents and other such products.

DETAILED DESCRIPTION OF THE PREFERRED EMBODIMENTS

With the discovery of the total and partial esters of gellan according to the present invention a new use of the esters of gellan was also discovered, i.e., their use as vehicles for pharmaceutically active substances, especially substances with topical, oral, rectal or ocular action, but also for parenteral use. The present invention, therefore, is also directed to these new uses and the respective products, and preferably the pharmaceutical preparations containing the gellan ester of the present invention as a vehicle for active substances.

The gellan esters of the present invention can be used as vehicles for pharmacologically active substances having an alcohol component which form an ester bond with gellan. Of the pharmaceutical preparations of the present invention, those containing an ester of gellan derived from a therapeutically active alcohol, such as one of those cited hereinafter, are of particular interest.

The invention also encompasses salts of the partial esters of gellan with metals or organic bases. The terms "esters of gellan" or "gellan esters" should be taken to mean both the esters themselves and their said salts. In particular, pharmaceutical preparations with one or more pharmacologically active substances can have, as said vehicle, pharmacologically active or inactive gellan esters, or basic pharmacologically active substances can be used to salify all or some of the free carboylate groups of the gellan partial esters.

The present invention makes available to the aforesaid industrial and scientific sectors, an assortment of new products which answer a demand for improved products.

The monovalent esters according to the present invention are superior when administered to organisms, since residues of monovalent alcohols are metabolized in an organism to degradation products which do not present any particular toxic problems. This is true, naturally, for esters which are derived from alcohols which do not contain toxic substituents, such as, and especially, monovalent aliphatic or cycloaliphatic alcohols. Therefore, the new esters will be especially advantageous in the food industry for the above reason.

The low level of toxicity of the esters of numerous monovalent alcohols of gellan according to the present invention can be utilized mainly in the pharmaceutical, cosmetic, sanitary-surgical and agro-alimentary fields, where the new gellan esters can be used as biodegradable plastic materials with various functions as needed and described below. Thus, for example, the gellan esters can be used as additives for a wide variety of polymeric materials used for sanitary and surgical articles, such as polyurethanes, polyesters, polyolefins, polyamides, polysiloxanes, vinylic and acrylic polymers with the effect of increasing the biocompatibility of these materials.

In the cosmetic and pharmaceutical fields the gellan esters of the invention can be used to prepare ointments, creams and other types of medicaments for topical application or cosmetic products, such as sunshield creams, where they serve as stabilizers and emulsifying agents. In pharmaceuticals they can be used to the same advantage as disintegrating agents or as binding agents for tablets. According to a particularly important aspect of the present invention, the gellan esters are useful as a vehicle for pharmacologically active substances, especially those for topical or ocular application. This application of the new esters can be carried out in different manners, such as:
1) the gellan ester serves as the actual vehicle which is physically and, possibly, mechanically associated with the active substance;
2) the (partial) ester of gellan is salified with the active substance; or
3) the gellan ester is esterified with an alcohol which is the active substance.

Combinations of the above can also be used; for example 1) and 2), or 1) and 3), and within 2) and 3), different alcohol residues can be combined in the gellan ester, or with the basic components in gellan ester salts, and it is possible to obtain mixed-type esters, in which the alcohol residues are derived partly from pharmacologically inactive alcohols and partly from pharmacologically active alcohols, and likewise, for the gellan ester salts, it is possible to obtain in the same ester both inactive basic residues, as in the case of metal salts, and therapeutically active organic base residues.

A first group of gellan esters according to the present invention, useful in said industrial sectors, and that is, for example, in the food, paper, textile, and printing industries, and in the preparation of sanitary, medical-surgical, detergent and household articles etc., is represented by those in which the properties of the gellan component are to be exploited. Such esters are derived from aliphatic, araliphatic, cycloaliphatic or heterocyclic alcohols which have no toxic or pharmacological action, such as saturated alcohols of the aliphatic series or alcohols of the cycloaliphatic series. Examples of one of these alcohols are cited hereinafter.

A second group of useful gellan esters is represented by therapeutically useful gellan esters wherein the pharmacological properties of the alcohol component are dominant, i.e., esters of gellan with pharmacologically active alcohols, such as steroid alcohols, for example, cortisone and its derivatives. These esters possess properties which are qualitatively similar to those of the alcohol, but with a more differentiated spectrum of action, with respect also to known esters, ensuring a more balanced, constant and regular pharmacological action and usually producing a marked retard effect.

A third group of gellan esters according to the present invention, is represented by esters in which a portion of the carboxylic groups of gellan are esterified with a pharmacologically active alcohol and another portion is esterified with a alcohol which is not pharmacologically active or has negligible activity. By measuring the percentages of the two types of alcohols as esterifying components, i.e., balancing the ratio between the two types of alcohol moieties, it is possible to obtain gellan esters with the same activity as the pharmacologically active alcohol and having the aforesaid advantages of increased stability and bioavailability with respect to the desired and characteristic activity of the pharmacologically active alcohol due to the ester groups of the pharmacologically inert acid.

A fourth group of esters is represented by those of a mixed character wherein the ester groups are derived from two different therapeutically active alcohols. In this case too, the esters can be partial or total, and that is, only some carboxylic groups are derived from two different therapeutically active alcohols, for example from a cortisone steroid and from an antibiotic, while the other groups can be free or salified, for example with alkaline metals, especially sodium, or all the carboxylic groups can be esterified with said alcohols. It is also possible to prepare esters with three or more alcohol components, for example esters in which a portion of the carboxylic groups are esterified with a therapeutically active alcohol, another portion with another therapeutically active alcohol, a third portion with a therapeutically inactive alcohol and a fourth portion is possibly salified with a metal or with a therapeutically active or inactive base or in its free form.

In the gellan esters described above in which the carboxyl acid groups remain free, these can be salified with metals or with organic bases, for example with alkaline or alkaline earth metals or with ammonia or nitrogenous organic bases.

The invention also includes the use of gellan esters of inert alcohols to be mixed with therapeutically active substances, and in all cases the free carboxyl groups can be salified with inactive, but therapeutically acceptable bases, or with therapeutically active bases, as well as the medicaments or the pharmaceutical preparations resulting from said use of the gellan esters.

The main object of the present invention is therefore represented by the total or partial esters of gellan with alcohols of the aliphatic, araliphatic, cycloaliphatic or heterocyclic series and salts of said partial esters with inorganic or organic bases.

A second object of the invention is represented by a process for the preparation of esters of gellan which comprises treating a quaternary ammonium salt of gellan with an esterifying agent in an aprotic solvent, and, if desired, by salifying in the partial gellan esters thus obtained at the free carboxylic groups, with inorganic or organic bases.

A third object of the invention is constituted by the use of gellan esters as vehicles for substances for cosmetic application, for pharmaceutically active substances and for pharmaceutical preparations or medicaments including:

1) a pharmacologically active substance or in association with pharmacologically active substances;
2) a vehicle constituted by a total or partial ester of gellan or by the salts of said partial esters with inorganic or organic bases, or by pharmaceutical preparations or medicaments constituted by an ester of gellan, possibly salified with inorganic or organic bases, in which at least one ester group or one salified carboxylic group derives from a therapeutically active alcohol or base.

Alcohols of the aliphatic series for use as esterifying components of the carboxylic groups of gellan according to the present invention are for example those having from 1 to 34 carbon atoms, which can be saturated or unsaturated and which can possibly be substituted by other free functional or functionally modified groups, such as amino, hydroxy, aldehyde, keto, mercapto, carboxy groups or by groups derived from these, such as hydrocarbyl dihydrocarbylamino groups (here and hereafter meaning by the term "hydrocarbyl" not only monovalent radicals of hydrocarbons, for example of the $C_nH_{2n+1}$ type, but also bivalent or trivalent radicals, such as "alkylenes" —$C_nH_{2n}$— or "alkylidenes" =$C_nH_{2n}$), ether or ester groups, acetal or ketal groups, thioether or thioester groups, and esterified carboxy groups or carbamidic groups and carbamidic groups substituted by one or two hydrocarbyl groups, by nitrile groups or by halogens.

In the above said groups containing hydrocarbyl radicals, these are preferably lower aliphatic radicals, such as alkyls, with a maximum of 6 carbon atoms. Such alcohols can also be interrupted in the carbon chain by heteroatoms, such as oxygen, nitrogen and sulfur atoms.

Alcohols substituted with one or two of said functional groups are preferred.

Alcohols of the above group to be used preferentially within the terms of the present invention are those with from 1 to 12 and especially with from 1 to 6 carbon atoms and in which the hydrocarbyl radicals in said amino, ether, ester, thioether, thioester, acetal, ketal groups represent alkyl groups with from 1 to 4 carbon atoms, and also in the esterified carboxy groups or substituted carbamidic groups the hydrocarbyl groups are alkyls with the same number of carbon atoms, and in which the amino or carbamide groups can be alkyleneamino or alkylenecarbamidic groups with from 1 to 8 carbon atoms. Of these alcohols, those which are saturated and unsubstituted, such as methyl, ethyl, propyl, isopropyl alcohols, n-butyl alcohol, isobutyl alcohol, tertbutyl alcohol, amyl alcohol, pentyl, hexyl, octyl, nonyl and dodecyl alcohol are preferred. Particularly preferred are those with a linear chain, such as n-octyl or n-dodecyl alcohols. Of the substituted alcohols of this group, bivalent alcohols such as ethyleneglycol, propyleneglycol or butyleneglycol; trivalent alcohols such as glycerin; aldehydo alcohols such as tartronic alcohol; carboxylic alcohols such as lactic acids, for example α-oxypropionic acid, glycolic acid, malic acid, tartaric acid, citric acid, amino alcohols, such as aminoethanol, aminopropanol, n-aminobutanol, and their dimethyl and diethyl derivatives in the aminic function, choline, pyrrolidinylethanol, piperidinylethanol, piperazinylethanol and the corresponding derivatives of n-propyl or n-butyl alcohols, monothioethyleneglycol or its alkyl derivatives, for example its ethyl derivative in the mercapto function are contemplated.

Examples of higher saturated aliphatic alcohols are cetyl alcohol and myricyl alcohol. Of special importance for the purposes of the present invention are the higher unsaturated alcohols with one or two double bonds, such as especially those contained in many essential oils and having an affinity with terpenes, such as citronellol, geraniol, nerol, nerolidol, linalol, farnesol, phytol. Lower unsaturated alcohols to be considered are allyl alcohol and propargyl alcohol.

Araliphatic alcohols are those with only one benzene residue and the aliphatic chain has from 1 to 4 carbon atoms and in which the benzene residue can be substituted by between 1 and 3 methyl or hydroxy groups or by halogen atoms, particularly chlorine, bromine or iodine, and in which the aliphatic chain can be substituted by one or more functions chosen from the group formed by free amino groups or mono- or dimethyl groups or pyrrolidine or piperidine groups. Of these alcohols, benzyl alcohol, phenethyl alcohol are especially preferred.

The alcohols of the cycloaliphatic or aliphatic cycloaliphatic series may be derived from mono or polycyclic hydrocarbons and may have from 1 to 34 carbon atoms. Of the alcohols derived from cyclic monoanular hydrocarbons, having from 1 to 12 carbon atoms, with rings containing preferably between 5 and 7 carbon atoms, possibly substituted, for example, with one to three lower alkyl groups, such as methyl, ethyl, propyl or isopropyl groups. Specific alcohols of this group are cyclohexanol, cyclohexanediol, 1,2,3-cyclohexanetriol and 1,3,5-cyclohexanetriol (phloroglucitol), inositol, and the alcohols derived from p-menthane, such as carvomenthol, menthol, α and γ-terpineol, 1-terpinenol, 4-terpinenol and piperitol, or a mixture of these alcohols known as "terpineol" 1,4-and 1,8-terpin. Of the alcohols derived from hydrocarbons with condensed rings, for example those of the thujane, pinane and camphane groups, e.g., thujanol, sabinol, pinol hydrate, D- and L-borneol and D- and L-isoborneol.

Polycyclic, aliphatic cycloaliphatic alcohols to be used in obtaining the esters of the present invention are sterols, cholic acid and steroids, such as sexual hormones and their synthetic analogues and in particular corticosteroids and their derivatives. Thus, it is possible to use for example: cholesterol, dihydrocholesterol, epidihydrocholesterol, coprosterol, epicoprosterol, sitosterol, stigmasterol, ergosterol, cholic acid, deoxycholic acid, lithocholic acid, estriol, estradiol, equilenin, equilin and their alkyl derivatives, as well as ethynyl or propynyl derivatives at position 17, for example 17-ethynyl-estradiol or 7-methyl-17-ethynyl-estradiol, pregnenolone, pregnandiol, testosterone and its derivatives, such as 17-methyltestosterone, 1,2-dehydrotestosterone and 17-methyl1,2-dehydrotestosterone, the alkyl derivatives in position 17 of testosterone and of 1,2-dehydrotestosterone, such as 17-ethynyl-testosterone, 17-propynyltestosterone, norgestrel, hydroxyprogesterone, corticosterone, deoxycorticosterone, 19-nortestosterone, 19-nor-17-methyltestosterone and 19-nor-17-ethynyltestosterone, cortisone, hydrocortisone, prednisone, prednisolone, fludrocortisone, dexamethasone, betamethasone, paramethasone, flumethasone, fluocinolone, fluprednylidene, clobetasol, beclomethasone, aldosterone, deoxycorticosterone, alphaxolone, alphadolone, bolasterone and antihormones such as cyproterone.

Also useful as esterifying components for the esters of the present invention are genins (aglycons) of cardioactive glycosides, such as digitoxigenin, gitoxigenin, digoxigenin, strophanthidin, tigogenin and saponin.

Other alcohols to be used according to the invention are vitamin alcohols, such as axerophthol, vitamins D2 and D3, aneurin, lactoflavin, ascorbic acid, riboflavine, thiamine, pantothenic acid.

Of the heterocyclic alcohols useful, for example, are furfuryl alcohol, alkaloids and derivatives such as atropine, scopolamine, cinchonine, cinchonidine, quinine, morphine, codeine, nalorphine, N-butylscopolammonium bromide, ajmaline; phenylethylamines such as ephedrine, isoproterenol, epinephrine; phenothiazine drugs such as perphenazine, pipothiazine, carphenazine, homofenazine, acetophenazine, fluphenazine, N-hydroxyethyl-promethazine chloride; thioxanthene drugs such as flupenthixol and clopenthixol; anticonvulsants such as meprophendiol, antipsychotics such as opipramol; antiemetics such as oxypendyl; analgesics such as carbetidine and phenoperidin and methadol; hypnotic drugs such as etodroxizine; anorexics such as benzhydrol and diphemethoxidine; minor tranquilizers such as hydroxyzine; muscle relaxants such as cinnamedrine, diphylline, mephenesin, methocarbamol, chlorphenesin, 2,2-diethyl-1,3-propanediol, guaifenesin, idrocilamide; coronary vasodilators such as dipyridamole and oxyfedrine; adrenergic blockers such as propanolol, timolol, pindolol, bupranolol, atenolol, metoprolol, practolol; antineoplastics such as 6-azauridine, cytarabine, floxuridine; antibiotics such as chloramphenicol, thiamphenicol, erythromycin, oleandomycin, lincomycin; antivirals such as idoxuridine; peripheral vasodilators such as isonicotinyl alcohol; carbonic anhydrase inhibitors such as sulocarbilate; anti-asthmatics and anti-inflammatories such as tiaramide; sulfamidics such as 2-p-sulfanylanilinoethanol.

As discussed previously, in some cases gellan esters in which the ester groups are derived from two or more therapeutically active hydroxy substances may be used, and all possible variations of the same. Especially useful are the substances in which two different types of ester group derived from drugs with a hydroxy character are present and in which the remaining carboxylic groups are free, salified with metals or with one or several of the bases listed hereinafter, possibly also bases which are themselves therapeutically active, for example with the same or similar activity to that of the esterifying component. In particular it is possible to have gellan esters derived, on the one hand, from an anti-inflammatory steroid, such as those cited above, and on the other hand from a vitamin, from an alkaloid, or from an antibiotic, such as those previously listed.

The degree of esterification of gellan with the aforesaid alcohols depends on the special properties desired for the various fields of application, for example greater or lesser lipophilic or hydrophilic properties with regard to certain tissues, for example the skin. Generally, a high degree of esterification, up to total esterification of gellan, increases its lipophilic characteristics and therefore decreases its solubility in water. For a therapeutic use of the new esters of this invention, for example, the degree of esterification should be regulated so as to ensure, despite the good lipophilic qualities which are better than those of natural gellan, adequate water solubility, for example a solubility of 10 mg/ml. Naturally, the influence of the molecular size of the esterifying component itself must be borne in mind. This usually influences water solubility in an inversely proportional manner.

As reported previously, esterification of the carboxylic groups of gellan can have various advantages, which can be exploited in various fields, for example in medicine, using the esters as therapeutic agents, or in surgery, using them as plastic articles. Their therapeutic use has already been discussed above and the esterification of a therapeutically active alcohol can be considered, such as an antiinflammatory corticosteroid for example, with gellan as a means of improving its therapeutic efficacy.

Regarding similar therapeutically active alcohols, gellan therefore acts as a particularly efficient vehicle which is perfectly compatible with the biological environment. The above reported list of alcohols to be used for esterification according to the present invention features a number of these pharmacologically active alcohols and the indications of the corresponding gellan esters are the same as those for the free alcohols themselves. Again, as reported earlier, in partial esters with therapeutically active alcohols it is possible to esterify part or all of the remaining carboxylic groups of the gellan component with pharmacologically inert alcohols, such as saturated lower aliphatic alcohols, for example ethyl or isopropyl alcohol.

A particularly useful aspect of the present invention is the possibility of preparing drugs which are more stable than those available to date.

For example, it is possible to obtain drugs with a "retard" or controlled or delayed release effect with gellan esters with therapeutically active alcohols, possibly salified also with therapeutically active bases.

For use in cosmetics it is preferable to use total or partial esters of gellan with pharmacologically inert alcohols, for example saturated or unsaturated aliphatic alcohols, for example unsubstituted alcohols of this type with straight or ramified chains, for example with between 1 and 8 carbon atoms, such as those specifically cited. Of particular interest are also unsaturated alcohols, for example with one or more double bonds, such as vinyl or allyl alcohol and their condensed derivatives, such as especially polyvinyl alcohol or polyvalent alcohols, such as glycerin. In this case too, it is possible to use mixed esters, according to the intended use.

Cycloaliphatic alcohols are also useful, for example those derived from cyclopentane or cyclohexane and their derivatives substituted by lower alkyl groups, for example alkyls with between 1 and 4 carbon atoms, especially from methyl groups. Of particular interest are also esters with cycloaliphatic and aliphatic-cycloaliphatic alcohols derived from terpenes, such as those cited previously and from therapeutically active alcohols, and which can otherwise be used in cosmetics.

The alcohols to be used preferably in the manufacture of sanitary and surgical articles are essentially the same as those listed above for use in cosmetics.

In the esters according to the invention the percentage of esterified groups may vary greatly according to the intended use of the product, that is, mainly with regard to its use in the various fields of application cited above.

Thus, for example, for the manufacture of sanitary-surgical articles it is preferable to use total or partial esters with a high degree of esterification, for example between 80% and 100% of all the carboxylic groups present.

Of particular interest are also those partial esters in which at least 5% and at the most 90% of all the carboxylic groups of the gellan are esterified, and especially those with a percentage ranging from 50 to 80%, to be used preferably in foodstuffs, cosmetics and in the pharmaceutical field.

Clearly, in the mixed, partial esters the ratio between the numbers of different types of ester groups may vary, for example in the case of two types of such groups, the ratio varies preferably between 0.1:1 and 1:0.1, and this is true also of total esters. For esters intended for therapeutic use the ratio varies preferably between 0.5:1 and 1:0.5. Such ratios are preferably also valid for total esters and, in the case of partial esters, they are to be taken preferably with reference to the percentages cited above regarding the inclusive number of esterified groups. In the partial esters of the invention, the non-esterified carboxylic groups may be kept free or they may be salified. The bases for the formation of such salts are chosen according to the end use of the product. It is possible to form inorganic salts from alkaline metals, such as potassium and in particular sodium and ammonium, or to derive salts from alkaline earth metals, such as calcium or magnesium or aluminum salts.

Moreover, of particular interest are the salts with organic bases, especially azotized bases, and therefore aliphatic, araliphatic, cycloaliphatic or heterocyclic amines.

These ammonium salts may be derived from amines which are therapeutically active or nontoxic but therapeutically inactive amines. Of the former, preferred are the aliphatic amines, for example mono-, di-and tri-alkylamines with alkyl groups from 1 to 8 carbon atoms or arylalkylamines with the same number of carbon atoms in the aliphatic part and where aryl means a benzene group, possibly substituted by between 1 and 3 methyl groups or halogen atoms or hydroxy groups. The biologically inactive bases for the formation of salts may also be cyclic, such as monocyclic alkyleneamines with rings having between 4 and 6 carbon atoms, possibly interrupted in the cycle by heteroatoms chosen from the group selected from nitrogen, oxygen and sulphur, such as piperazine or morpholine, or may be substituted, for example by amino or hydroxy functions, such as aminoethanol, ethylenediamine, ephedrine or choline.

It is also possible to form quaternary ammonium salts of the partial esters, for example tetraalkylammonium salts with said number of carbon atoms and preferably salts of this type in which the fourth alkyl group has between 1 and 4 carbon atoms, for example a methyl group.

The biologically active amines to be used for salification and whose therapeutic action is to be exploited are all known azotized and basic drugs such as those included in the following groups: alkaloids, peptides, phenothiazine, benzodiazepine, thioxanthene, hormones, vitamins, anticonvulsants, antipsychotics, antiemetics, anesthetics, hypnotics, anorexics, tranquilizers, muscle relaxants, coronary vasodilators, antineoplastics, antibiotics, antibacterials, antivitals, antimalarials, carbonic anhydrase inhibitors, non-steroid anti-inflammatory agents, vasoconstrictors, cholinergic agonists, cholinergic blockers, adrenergic agonists, adrenergic antagonists, narcotic antagonists.

Examples of specific useful drugs are all those drugs mentioned above having azotized basic groups regarding gellan esters with therapeutically active alcohols or those cited hereinafter in the present text, for example the various antibiotics.

Salification of the partial esters with said therapeutically active bases and the use of such salts represents a particular case where gellan esters act as a vehicle. It can be achieved by the simple addition to the active substance of total or partial esters or their salts with one of the aforesaid therapeutically acceptable, but not biologically active, substances, especially with alkali metals, for example sodium.

The use of the gellan esters as vehicles, therefore, opens up possibilities for new medicaments wherein the components are:

1) a pharmacologically active substance or an association or mixture of two or more such substances; and
2) a gellan ester as defined above or one of its salts, and such medicaments are a further object of the present invention.

The gellan esters to be used in these medicaments are those in which the esterifying alcohol is not itself pharmacologically active, for example a simple aliphatic alcohol, as described above. Medicaments of this kind in which the ester too is pharmacologically active, as for example in the case of one of the aforesaid esters derived from pharmacologically active alcohols, are however included in the invention.

In such medicaments, if partial esters of gellan are used, the possible salification of the remaining carboxy groups is preferably performed with therapeutically neutral inorganic or organic bases, especially with alkaline metals such as sodium or ammonium. If the active substance 1) or a corresponding association of substances have basic groups, such as antibiotics containing amino groups, and if the partial esters of gellan be used with remaining free carboxy groups, a salt is formed between the gellan esters and the basic substances. The basic substance may of course be excessive, thus having basic salts. The medicaments of the present invention, therefore, include partial esters of gellan, partially salified with pharmacologically active substances of a basic character, as described above. The non-esterified carboxy groups may also be salified with therapeutically active bases, if the vehicles are substances of a non-basic nature. The use of gellan esters as a vehicle is particularly useful in ophthalmology, where a particular compatibility can be seen between the new products and the corneal epithelium, with consequent excellent tolerability, with no sensitization effects.

Moreover, when the medicaments are administered as concentrated solutions with viscoelastic characteristics or in solid form, it is possible to obtain on the corneal epithelium, a homogeneous and stable film preparation which are perfectly transparent and adherent and which guarantee prolonged bioavailability of the drug with an excellent "retard effect". Such ophthalmic medicaments are of particular value in the veterinary field, considering that there are no available veterinary preparations containing chemical agents for the treatment of the eye. Indeed, preparations for human use are usually used, but they cannot always guarantee a specific range of action in animals and they do not allow for the particular conditions in which treatment is performed. For example, this is the case of therapy for infectious keratoconjunctivitis, pink eye or IBK, an infection mainly afflicting cattle, sheep and goats. Presumably, specific etiological factors exist for these three species. For instance, in the case of cattle the main microorganism involved seems to be Moraxella bovis (even though it is impossible to exclude other agents of vital origin, such as the Rhinotracheitis virus, Micoplasma, Rickettsiae and Chlamydia in sheep, Rickettsiae in goats). The disease is acute and tends to spread rapidly: in its early stages the symptoms are characterized by blepharospasm and excessive watering, followed later by purulent discharge, conjunctivitis and keratitis, often accompanied by high temperature, reduced appetite and reduced milk production. Particularly serious are corneal lesions which in the final stages of the disease can even result in perforation of the cornea. The clinical course varies from a few days to several weeks. A wide variety of treatments based on chemical agents are used, administered both by the topical route (often associated with antiinflammatory steroids), and the systemic route. Examples of these are: tetracyclines; such as oxytetracycline, penicillins, such as cloxacillin and benzylpenicillin, sulfamides, polymixin B (associated with miconazole and prednisolone), chloramphenicol and tylosin. Topical treatment of the disease, despite its apparent simplicity, is still an open problem, since for one reason or another with the ophthalmic preparations available to date it has never been possible to reach therapeutically efficient concentrations of antibiotic and sulfamidic in the lacrimal secretion.

This is understandable in the case of solutions, considering that such animals usually incline their heads downwards, but it is also true of semisolid medicaments, as the excipients commonly used in these do not have the necessary qualities of adhesion to the corneal surface, as they do not generally contain a sufficiently high concentration of active substance and being unable to achieve perfect distribution (presence of a distribution gradient).

Such drawbacks to conventional eye drops are described by Slatter et al. in "Austr. Vet. J., " 1982 59 (3), pp. 69–72.

The esters of the present invention overcome these difficulties. The presence of the gellan ester as a vehicle for ophthalmic drugs allows the formulation of excellent preparations with no concentration gradients and therefore being perfectly homogeneous, transparent and adhesive to the corneal epithelium, with no sensitization effects, providing a perfect vehicle for the active substance and possibly having a retard effect.

Said properties of the new medicaments can of course be exploited in fields other than ophthalmology: they can be applied in dermatology and in conditions affecting the mucous membranes, for example in the mouth.

They can also be used to obtain a systemic effect via transcutaneous reabsorption, for example in suppositories. All these applications are possible both in human and veterinary medicine. In human medicine the new medicaments are particularly suitable for use in pediatrics. The present invention therefore includes in particular any one of these therapeutic applications.

The term active substance of component 1) according to the invention should hereinafter be taken to also mean the association or mixture of two or more active substances. Said component 1) can be generically catalogued according to its use in the various fields of therapy, starting by distinguishing between human and veterinary medicine and then specifying the different areas of application, with respect to the organs and tissues to be treated, in ophthalmology, dermatology, otolaryngology, gynecology, aniology, neurology or any type of pathology of the internal organs which can be treated by topical application, for example rectal application. According to a particular aspect of the present invention, the pharmacologically active substance 1) is a substance for ophthalmic use. By another criterion the pharmacologically active substance 1) must be distinguished according to its effect, and can, for example, be an anesthetic, analgesic, antiinflammatory, vasoconstrictor, antibacterial, or antiviral drug. In ophthalmology the indications can be for: miotic, antiinflammatory, wound healing and antimicrobial effects. Component 1) can also be, according to the invention, an association of two or more active substances, as contained in many known medicaments.

For example, in ophthalmology there can be an association between an antibiotic, an antiphlogistic and a vasoconstrictor, or several antibiotics can be associated with one or more antiphlogistics, or one or more antibiotics with a mydriatic or a myotic or wound healer or antiallergic agent etc. For example the following associations of ophthalmic drugs can be used: kanamycin + phenylephrine + dexamethasone phosphate, kanamycin + betamethasone phosphate + phenylephrine, or similar associations with other antibiotics used in ophthalmology, such as rolitetracycline, neomycin, gentamycin, tetracycline.

In dermatology it is possible to have as active component 1) associations of different antibiotics, such as erithromycin, gentamycin, neomycin, gramicidin, polymyxin B, with each other or the same antibiotics with antiinflammatories, for example corticosteroids, for example hydrocortisone + neomycin, hydrocortisone + neomycin + polymyxin B + gramicidin, dexamethasone + neomycin, fluorometholone + neomycin, prednisolone + neomycin, triamcinolone + neomycin + gramicidin + nystatin, or any other association used in conventional preparations for use in dermatology.

Associations of different active substances are not of course limited to these fields, but in each of the abovesaid sectors of medicine it is possible to use associations similar to those already in use for the pharmaceutical preparations known to the art.

In the above-referred case for use of a substance 1) with a basic character, the salts which form with a partial gellan ester can be of different types, and that is, all the remaining carboxy groups can be salified or only an aliquot thereof, thus obtaining esters - acid salts, or esters - neutral salts. The number of acid groups to be kept free can be important for the preparation of medicaments with a particular pH. According to a particular aspect of the invention it is possible to prepare such medicaments starting from the previously isolated and possibly purified salts, in their anhydrous solid state, as amorphous powders, which, on contact with the tissue to be treated constitute a concentrated aqueous solution of a gelatinous character, viscous consistency and with elastic properties. These qualities are maintained even at stronger dilutions and it is therefore possible to use, in place of said anhydrous salts, more or less concentrated solutions in water or in saline, possibly with the addition of other excipients or additives, such as other mineral salts to regulate the pH and osmotic pressure. It is, of course, possible to use such salts also for the preparation of gels, inserts, creams or ointments, containing other excipients or ingredients used in traditional formulations of such pharmaceutical preparations.

According to a preferred aspect of the invention medicaments containing gellan ester or its salts with therapeutically active or inactive substances are used as the sole vehicle (with the possible exception of aqueous solvent). Also included in the invention are the mixtures obtainable from all the types of medicaments here described and also mixtures of said medicaments, and also possibly mixtures of gellan esters with free gellan or mixtures of their salts, for example sodium salts.

Examples of pharmacologically active substances 1) for use in ophthalmic medicaments according to the invention are: basic and non-basic antibiotics, for example aminoglycosides, macrolides, tetracyclines and peptides, for example gentamycin, neomycin, streptomycin, dihydrostreptomycin, kanamycin, amikacin, tobramycin, spectinomycin, erythromycin, oleandomycin, carbomycin, spiramycin, oxytetracycline, tetracycline, bacitracin, polymyxin B, gramicidin, coilstin, chloramphenicol, lincomycin, vancomycin, novobiocin, ristocetin, clindamycin, amphotericin B, griseofulvin, nystatin and possibly their salts, as sulfates or nitrates, or associations of the same or with other active principles, for example those cited hereinafter. Other ophthalmic drugs which can be used to advantage according to the present invention are: other antiinfective agents such as diethylcarbamazine, mebendazole, sulfamidics such as sulfacetamide, sulfadiazine, sulfisoxazole; antiviral and antitumoral agents such as iododeoxyuridine, adenine arabinoside, trifluorothymidine, acyclovir, ethyldeoxyuridine, bromovinyldeoxyuridine, 5-iodo-5'-amino-2',5'-di-deoxyuridine; antiinflammatory steroids, for example dexamethasone, hydrocortisone, prednisolone, fluorometholone, medrisone and possibly their esters, for example esters of phosphoric acid; non-steroid antiinflammatory agents, for example indomethacin, oxyphenbutazone, flurbiprofen; wound healers such as epidermal growth factor EGF; local anesthetics, such as Benoxinate, proparacaine and possibly their salts; cholinergic agonists such as pilocarpine, methacholine, carbamylcholine, aceclidine, physostigmine, neostigmine, demecarium and their salts; cholinergic blockers such as atropine and its salts; adrenergic agonists such as noradrenaline, adrenaline, naphazoline, methoxamine and possibly their salts; adrenergic blockers such as propanolol, timolol, pindolol, bupranolol, atenolol, metoprolol, oxprenolol, practolol, butoxamine, sotalol, butethrin, labetalol and their salts.

Associations or mixtures of such drugs with each other and possibly with other active principles can also be used as component 1) according to the invention. If in place of a single active substance 1) associations of active substances are used, such as those reported above, the salts between the basic active substances and the partial ester of gellan can be mixed salts of one or more such basic substances or possibly mixed salts of this kind with a certain number of other acid groups of the polysaccharide salified with the aforesaid metals or bases. For example, it is possible to prepare salts of a partial gellan ester with a pharmacologically inactive alcohol, for example a low alkanol and with a certain percentage of acid groups salified with the antibiotic kanamycin, another percentage with the vasoconstrictor phenylephrine, and a remaining percentage of the free acid groups possibly salified for example with sodium or one of the other aforesaid metals. It is also possible to mix this type of mixed salt with free gellan or its fractions or their metal salts, as previously indicated for the medicaments constituted by salts of only one active substance with said polysaccharide esters.

Examples of active substances to be used alone or in association with each other or with other active principles in dermatology are: therapeutic agents such as antiinfectives, antibiotics, antimicrobials, antiinflammatories, cytostatics, cytotoxics, antivirals, anesthetics, and prophylactic agents such as sun shields, deodorants, antiseptics and disinfectants. Examples of antibiotics, are erythromycin, bacitracin, gentamycin, neomycin, aureomycin, gramicidin and associations of the same. Noteworthy examples of antibacterials and disinfectants are nitrofurazone, mafenide, chlorhexidine, and derivatives of 8-hydroxyquinoline and their salts; noteworthy examples of antiinflammatory agents are the corticosteroids such as prednisolone, dexamethasone, flumethasone, clobetasol, triamcinolone acetonide, betamethasone or their esters, such as valerianates, benzoates, dipropionates; cytotoxic agents such as fluorouracil, methotrexate, podophyllin; anesthetics such as dibucaine, lidocaine, benzocaine. This list serves only to give examples and any other agent described in the literature can be used. From the examples cited for ophthalmology and dermatology it is possible to extrapolate which medicaments according to the present invention are to be used in the aforesaid medical fields, for example in otolaryngology or dentistry or in internal medicine, for example in endocrinology, where it is possible to use preparations for intradermal absorption or through the mucous membrane, for example rectal or intranasal absorption, for example nose sprays or preparations to be inhaled into the oral cavity or pharynx.

Such preparations can be, for example, antiinflammatories or vasoconstrictors or vasopressors such as those already cited for ophthalmology, vitamins, antibiotics, such as those cited above, hormones, chemotherapy agents, antibacterials etc. as cited above for use in dermatology.

The medicaments according to the invention can be in solid form, for example as freeze-dried powders containing solely the two components either as a mixture or packed separately.

On contact with the epithelium to be treated such solid medicaments form solutions, more or less concentrated according to the nature of the particular epithelium and with the same characteristics as the solutions previously prepared in vitro and which represent another particularly important aspect of the present invention. Such solutions are preferably in distilled water or in sterile physiological solutions and preferably contain no other pharmaceutical vehicle besides the gellan ester or of one of its salts. The concentrations of such solutions can also vary within wide limits, for example between 0.01 and 75% both for each of the two components taken separately and for their mixtures or salts. Preference is given in particular to solutions with a pronounced viscoelastic character, for example having a content of 10% to 90% of the medicament or each of its components.

Of particular importance are medicaments of this type, both in anhydrous form (freeze-dried powders) or as concentrated solutions or solutions diluted in water or saline, possibly with the addition of auxiliary substances, such as disinfectants or mineral salts acting as vehicle or other substances for ophthalmic use.

From the medicaments of the invention, the one to be chosen for each individual case is that which has a degree of acidity which is suitable for the environment in which it is to be applied, that is, with a physiologically tolerable pH. The pH can be adjusted, for example in said salts of the partial ester of gellan with a basic active substance, by suitably regulating the quantity of polysaccharide, of its salts and of the basic substance itself.

Thus, for example, if the acidity of a salt of the gellan partial ester with a basic substance is too high, the excess of free acid groups can be neutralized with said inorganic bases, for example with sodium or potassium or ammonium hydrate.

According to the new and original chemical procedure of the present invention, the gellan esters can be prepared to advantage by starting from the quaternary ammonium salts of gellan with an esterifying agent in preferably an aprotic organic solvent, such as dialkylsulfoxides, dialkylcarboxylamides, such as in particular lower alkyl dialkylsulfoxides, especially dimethylsulfoxide, and lower alkyl dialkylamides of lower aliphatic acids, such as dimethyl or diethyl formamide or dimethyl or diethylacetamide.

Other non-aprotic solvents too, however, should be considered, such as alcohols, ethers, ketones, esters, especially aliphatic or heterocyclic alcohols and ketones with low boiling points, such as hexafluoroisopropanol and trifluoroethanol. The reaction is brought about preferably within a temperature range of about 0° C. and 100° C., and especially between about 25° C. and 75° C., for example at about 30° C. Esterification is performed preferably by gradually adding the esterifying agent to said ammonium salt dissolved in one of the solvents mentioned, for example in dimethylsulfoxide.

As the alkylating agent, it is possible to use those mentioned above, especially the hydrocarbyl halides, for example alkyl halides. As starting quaternary ammonium salts, lower ammonium tetraalkylates are used preferably, the alkyl groups having preferably between 1 and 6 carbon atoms. First and foremost, tetrabutylammonium gellan is used. These quaternary ammonium salts can be prepared by reacting a metal salt of gellan, preferably one of those mentioned above, especially a sodium or a potassium salt, in an aqueous solution with a sulfonic resin salified with a quaternary ammonium base. Gellan of tetraalkylammonium salts can be retained by freeze-drying the eluate.

Such salts have proved easily soluble in said aprotic solvents, so esterification of gellan according to the aforesaid procedure is particularly easy and gives quantitative yields. Only by this procedure therefore is it possible to control the exact number of carboxylic groups of gellan to be esterified.

A variation of the previously described procedure consists in reacting the potassium or sodium salt of gellan, suspended in a suitable solvent such as dimethylsulfoxide, with a suitable alkylating agent in the presence of a catalytic quantity of a quaternary ammonium salt, such as tetrabutylammonium iodide. Gellan of any origin can be used to prepare the new esters according to the present invention.

In the partial esters of the present invention, all the remaining carboxylic groups can be salified or only some of the same, by controlling the base quantity so as to obtain the desired stoichiometric degree of salification. By correctly gauging the degree of salification it is possible to obtain esters with an ample range of different dissociation constants and which therefore give the desired pH, in solution or "in situ" on therapeutic application.

Another object of the present invention are pharmaceutical preparations containing an effective amount of one or more of the aforesaid gellan esters or medicaments resulting from the association of one such ester with a pharmacologically active substance as previously defined, that is, medicaments in which the gellan ester acts as a vehicle for the active substance.

The pharmaceutical preparations containing therapeutically active gellan esters, possibly in the form of said medicaments resulting from the association of components 1) and 2), contain traditional excipients and can be for oral, rectal, parenteral, subcutaneous, local or intradermal use.

The preparations can be in solid or semisolid form, for example, pills, tablets, gelatin capsules, capsules, suppositories, soft gelatin capsules. For parenteral and subcutaneous administration it is possible to use those forms intended for intramuscular or intradermal administration, or those intended for infusion or intravenous injection and these may therefore be prepared as solutions of the active compounds or as freeze-dried powders of the active compounds to be mixed with one or more pharmaceutically acceptable excipients or diluents, suitable for said uses and being osmotically compatible with the physiological fluids. For local use, preparations in the form of sprays such as nose sprays, creams or ointments for topical use or specially treated sticking plasters for intradermal administration should be considered.

An effective amount of the preparations of the invention can be administered to hosts such as humans or animals in need thereof. They contain preferably between 0.01% and 10% of active component for the solutions, sprays, ointments and creams; and between 1% and 100% and preferably between 5% and 50% of active compound for the preparations in solid form. Doses to be administered will depend on individual needs, on the desired effect and on the chosen route of administration. The daily dosage of such preparations can be calculated on the basis of those used for the known preparations for corresponding treatments with the therapeutically active alcohol. Thus, for example, the dosage of a gellan ester with cortisone can be determined from its content of said steroid and from the dosages at which it is usually administered when contained in known pharmaceutical preparations.

One particular form of pharmaceutical preparation is represented by said medicaments by the association of a gellan ester and an active substance, for example for topical use. These can be in solid form, for example as freeze-dried powders containing only the two components 1) and 2) as a mixture or packed separately. Such solid medicaments form, on contact with the epithelium to be treated, more or less concentrated solutions according to the nature of the epithelium, and have the same characteristics as the solutions previously prepared in vitro and which represent another particularly important aspect of the present invention. Such solutions are preferably in distilled water or in sterile physiological solutions and they contain preferably no other pharmaceutical vehicle besides the gellan ester or one of its salts. The concentrations of such solutions can also vary greatly, for example ranging from 0.01 and 75%, both in the case of the two components separately and of their mixtures or salts. Preference is given in particular to solutions with a pronounced visco-elastic character, for example with a content of between 10% and 90% of the medicament or of each of its components.

Of particular importance are medicaments of this type, both in anhydrous form (freeze-dried powders) or as solutions, either concentrated or diluted in water or physiological solution, possibly with the addition of auxiliary substances, in particular disinfectants or mineral salts acting as buffers, or other substances, for ophthalmic use. Of the medicaments of the invention, the one to be chosen in each case is one with a degree of acidity which is suitable for the environment to which it is to be applied, that is, with a physiologically tolerable pH. Adjustment of the pH, for example in said salts of the gellan esters with a basic active substance, can be performed by suitably regulating the quantity of polysaccharide, of its salts and of the basic substance itself. Thus, for example, if the acidity of a salt of a gellan ester with a basic substance is too high, the excess of free acid groups is neutralized with said inorganic bases, for example with sodium or potassium or ammonium hydrates.

The salts, according to the invention, can be prepared in known methods, by bringing solutions or aqueous suspensions or organic solvents into contact with the two components 1) and 2) and possibly bases or basic salts of the aforesaid alkaline or alkaline earth metals or magnesium or aluminum in set quantities and isolating the salts in anhydrous amorphous form according to known techniques. It is possible to prepare first, for example, aqueous solutions of the two components 1) and 2), releasing said components from the aqueous solutions of their salts with suitable ionic exchangers, pooling the two solutions at a low temperature, for example between 0° C. and 20° C., if the salt thus obtained is easily soluble in water it is freeze-dried, while the poorly soluble salts can be separated by centrifugation or filtration or decantation and subsequently dried. The dose of these associated medicaments too is based on that of the active principles used singly and can therefore be easily determined by the expert, by considering the recommended doses for the corresponding known drugs.

In the cosmetic articles according to the invention the gellan esters and their salts are mixed with the excipients commonly used in the art and are for example those listed above for the pharmaceutical preparations. Most used are creams, ointments, lotions for topical use in which the gellan ester or one of its salts can constitute the active cosmetic principle possibly with the addition of other cosmetically active principles, such as steroids, for example pregnenolone, or one of the active principles reported above. In such preparations the gellan ester can be an ester with an alcohol with cosmetic action, such as dexpanthenol, or an ester with an alcohol with no cosmetic action, such as a lower aliphatic alcohol, for example one of those cited, the effect is due to the intrinsic cosmetic properties of the polysaccharide component, as in the case of free gellan or its salts. The cosmetic articles can however be based on various other active principles, for example, disinfectants or sunshields or waterproofing or regenerating agents or antiwrinkle substances, or scented substances, especially perfumes, and in this case the gellan ester can itself be the active ingredient and can be derived from alcohols with such properties, for example, from higher aliphatic alcohols or terpene alcohols in the case of perfumes, or act as a vehicle for substances with those properties associated with them. Particularly important, therefore, are cosmetic compositions similar to the previously described medicaments in which the pharmaceutically active component 1) is substituted by a cosmetic factor and the respective salts. The use of said esters derived from alcohols in the perfume industry represents important technical progress, since it allows the slow, constant and prolonged release of the scented principles.

An important application of the present invention concerns sanitary and surgical articles already described, the methods for their manufacture and their use. The invention therefore encompasses all sanitary articles similar to those with gellan already on the market but containing a gellan ester or one of its salts in place of the free acid or one of its salts, for example inserts or ophthalmic lenses.

Surgical and sanitary articles, according to the present invention, are represented by the gellan esters regenerated as such from appropriate organic solutions and which can be made into woven, non-woven, sheet and thread forms, thus obtaining films, sheets or threads for use in surgery, as auxiliaries and substitutes for the skin in severe cases of damage to this organ, such as burns, or as suture threads in surgical operations or for use in sanitary articles. The invention includes, in particular, such uses and a process for the preparation of such articles which comprises the formation of a solution of gellan ester or of one of its salts in a suitable organic solvent, for example a ketone, an ester. The aprotic solvent, for example, an amide of a carboxylic acid, especially a dialkylamide or an aliphatic acid with between 1 and 5 carbon atoms and derived from alkylic groups with between 1 and 6 carbon atoms. The organic solvent can also be an organic sulfoxide, that is, a dialkylsulfoxide with alkyl group with between 1 to 6 carbon atoms, such as dimethylsulfoxide or diethylsulfoxide. The organic solvent can also be a fluorinated solvent with a low boiling point, such as hexafluoroisopropanol. The solution obtained is then exposed to a rolling or spinning process to remove the organic solvent by contact with another organic or aqueous solvent which can be mixed with the first solvent and in which the gellan ester is not soluble, especially lower aliphatic alcohol, for example ethyl alcohol (Wet spinning). If a solvent with a sufficiently low boiling point is used to prepare the solution of the gellan derivative, removing said solvent in dry conditions is accomplished with a gas current, especially suitably heated nitrogen (Dry spinning). Excellent results are also obtained with Dry-wet spinning.

The threads obtained with the gellan esters can be used to prepare gauzes to be used in the medication of wounds and in surgery. The use of such gauzes offers the extraordinary advantage in that they are biodegradable in the organism. The organisms contain enzymes which break down the ester into gellan and the corresponding alcohol, when a gellan ester derived from a therapeutically acceptable alcohol is used, such as ethyl alcohol. These gauzes and also the aforesaid threads can therefore be left in place inside the organism after surgery, being slowly reabsorbed after said degradation.

When preparing said sanitary and surgical articles, suitable plastifying materials can be added to improve their mechanical characteristics, such as in the case of threads, to improve their resistance to knots. Such plastifying agents can be, for example, alkaline salts of fatty acids, for example sodium stearate or sodium palmitate, and esters of organic acids with a large number of carbon atoms, etc.

Another application of the new esters where their biodegradability by the esterase enzymes present in the organism is exploited, is represented by the preparation of capsules for subcutaneous implant of medicaments or microcapsules for injection, for example by subcutaneous or intramuscular route.

Of great importance is also the preparation of microcapsules containing gellan esters, which removes all the problems previously connected with and limiting their use, for the reasons given above. This preparation method opens up a vast field of application where a retard effect is desired following injection.

Another medical-surgical application of the gellan esters is represented by the preparation of a wide variety of solid inserts such as plates, disks, sheets, etc., substituting those currently in use and made of metal or synthetic plastic material, where such inserts are intended to be removed after a certain period. Preparations made of animal collagen, being of a proteic nature, often cause unpleasant side effects such as inflammation or rejection phenomena. In the case of gellan esters this danger does not exist.

Also included in the application of the gellan esters, according to the present invention, in the medical-surgical field, are preparations of expandible material especially in the form of sponges, for the medication of various kinds of wounds or lesions.

The present invention also includes modifications in the preparation procedures of the new esters and their salts, in which a procedure is interrupted at any one stage or in which the procedure is started at an intermediate compound and the remaining steps are performed, or in which the starting products are formed in situ.

The invention is illustrated by the following Examples, without being limited by the same. Gellan is available from Kelco Merch, San Diego, Calif.

EXAMPLE 1

Preparation of the tetrabutylammonium salt of the gellan polysaccharide 850 mg of dry gellan (sodium salt), equal to 1.27 mEq. are solubilized in 700 ml of distilled water. The solution is passed on a column containing 50 ml of very acid ion exchange resin in tetrabutylammonium form. The eluate is neutralized with tetrabutylammonium hydroxide, then filtered and freeze-dried.

Yield: 990 mg.

EXAMPLE 2

Preparation of the (partial) ester containing 60% of the carboxylic groups in the form of n-propylic ester 665 mg (0.75 mEq.) of the tetrabutylammonium salt of gellan are solubilized in 30 ml of DMSO at 25° C. 0.146 g (0.84 mEq.) of propyl iodide are added. The solution is well shaken for 16 hrs at 30° C.

To transform the residue salified carboxylic groups from their tetrabutylammonium form to their tetramethylammonium form, 165 mg of tetramethylammonium chloride dissolved in 8 ml of distilled water are added. The solution is added drop by drop to 250 ml of acetone, while being shaken. The precipitate is separated by filtration, washed three times with 20 ml of acetone, then vacuum-dried.

Yield: 460 mg.

Quantitative determination of the degree of esterification of gellan was performed by IR and NMR spectroscopy.

Quantitative determination of the ester groups is also performed by the saponification method described on pages 169–172 of "Quantitative organic analysis via functional groups", 4th Edition, John Wiley and Sons Publication.

EXAMPLE 3

Preparation of the (partial) ester containing 17% of the carboxylic groups in the form of n-propylic ester.

665 mg (0.75 mEq.) of the tetrabutylammonium salt of gellan are solubilized in 30 ml of DMSO at 25° C. 41.5 mg (0.24 mEq.) of propyl iodide are added. The solution is well shaken for 16 hrs at 30° C. To transform the residue salified carboxylic groups from their tetrabutylammonium form to their tetramethylammonium form, 165 mg of tetramethylammonium chloride dissolved in 8 ml of distilled water are added.

The solution is added drop by drop to 250 ml of acetone, while being shaken. The precipitate is separated by filtration, washed three times with 20 ml of acetone, then vacuum-dried.

Yield: 460 mg.

Quantitative determination of the degree of esterification of gellan is performed by IR and NMR spectroscopy.

Quantitative determination of the ester groups is also performed by the saponification method described on pages 169–172 of "Quantitative organic analysis via functional groups", 4th Edition, John Wiley and Sons Publication.

EXAMPLE 4

Preparation of the (partial) ester containing 10% of the carboxylic groups in the form of n-propylic ester.

665 mg (0.75 mEq.) of the tetrabutylammonium salt of gellan are solubilized in 30 ml of DMSO at 25° C. 24.4 mg (0.14 mEq.) of propyl iodide are added. The solution is well shaken for 16 hrs at 30° C.

To transform the residue salified carboxylic groups from their tetrabutylammonium form to their tetramethylammonium form, 165 mg of tetramethylammonium chloride dissolved in 8 ml of distilled water are added.

The solution is added drop by drop to 250 ml of acetone, while being shaken. The precipitate is separated by filtration, washed three times with 20 ml of acetone, then vacuum-dried.

Yield: 462 mg.

Quantitative determination of the degree of esterification of gellan was performed by IR and NMR spectroscopy.

Quantitative determination of the ester groups was also performed by the saponification method described on pages 169-172 of "Quantitative organic analysis via functional groups", 4th Edition, John Wiley and Sons Publication.

EXAMPLE 5

Preparation of the (partial) ester containing 5% of the carboxylic groups in the form of n-propylic ester.

665 mg (0.75 mEq.) of the tetrabutylammonium salt of gellan are solubilized in 30 ml of DMSO at 25° C. 12.2 mg (0.07 mEq.) of propyl iodide are added. The solution is well shaken for 16 hrs at 30° C.

To transform the residue salified carboxylic groups from their tetrabutylammonium form to their tetramethylammonium form, 165 mg of tetramethylammonium chloride dissolved in 8 ml of distilled water are added.

The solution is added drop by drop to 250 ml of acetone, while being shaken. The precipitate is separated by filtration, washed three times with 20 ml of acetone, then vacuum-dried.

Yield: 460 mg.

Quantitative determination of the degree of esterification of gellan is performed by IR and NMR spectroscopy.

Quantitative determination of the ester groups is also performed by the saponification method described on pages 169–172 of "Quantitative organic analysis via functional groups", 4th Edition, John Wiley and Sons Publication.

EXAMPLE 6

Preparation of the (partial) ester containing 60% of the carboxylic groups in the form of ethyl ester.

665 mg (0.75 mEq.) of the tetrabutylammonium salt of gellan are solubilized in 30 ml of DMSO at 25° C. 0.131 g (0.84 mEq.) of ethyl iodide are added. The solution is well shaken for 16 hrs at 30° C. To transform the residue salified carboxylic groups from their tetrabutylammonium form to their tetramethylammonium form, 165 mg of tetramethylammonium chloride dissolved in 8 ml of distilled water are added.

The solution is added drop by drop to 250 ml of acetone, while being shaken. The precipitate is separated by filtration, washed three times with 20 ml of acetone, then vacuum-dried.

Yield: 460 mg.

Quantitative determination of the degree of esterification of gellan is performed by IR and NMR spectroscopy.

Quantitative determination of the ester groups is also performed by the saponification method described on pages 169–172 of "Quantitative organic analysis via functional groups", 4th Edition, John Wiley and Sons Publication.

EXAMPLE 7

Preparation of the (partial) ester containing 17% of the carboxylic groups in the form of ethyl ester.

665 mg (0.75 mEq.) of the tetrabutylammonium salt of gellan are solubilized in 30 ml of DMSO at 25° C. 37.4 mg (0.24 mEq.) of ethyl iodide are added. The solution is well shaken for 16 hrs at 30° C. To transform the residue salified carboxylic groups from their tetrabutylammonium form to their tetramethylammonium form, 165 mg of tetramethylammonium chloride dissolved in 8 ml of distilled water are added.

The solution is added drop by drop to 250 ml of acetone, while being shaken. The precipitate is separated by filtration, washed three times with 20 ml of acetone, then vacuum-dried.

Yield: 450 mg.

Quantitative determination of the degree of esterification of gellan is performed by IR and NMR spectroscopy.

Quantitative determination of the ester groups is also performed by the saponification method described on pages 169–172 of "Quantitative organic analysis via functional groups", 4th Edition John Wiley and Sons Publication.

EXAMPLE 8

Preparation of the (partial) ester containing 10% of the carboxylic groups in the form of ethyl ester.

665 mg (0.75 mEq.) of the tetrabutylammonium salt of gellan are solubilized in 30 ml of DMSO at 25° C. 21.8 mg (0.14 mEq.) of ethyl iodide are added. The solution is well shaken for 16 hrs at 30° C. To transform the residue salified carboxylic groups from their tetrabutylammonium form to their tetramethylammonium form, 165 mg of tetramethylammonium chloride dissolved in 8 ml of distilled water are added.

The solution is added drop by drop to 250 ml of acetone, while being shaken. The precipitate is separated by filtration, washed three times with 20 ml of acetone, then vacuum-dried.

Yield: 460 mg.

Quantitative determination of the degree of esterification of gellan is performed by IR and NMR spectroscopy.

Quantitative determination of the ester groups is also performed by the saponification method described on pages 169–172 of "Quantitative organic analysis via functional groups", 4th Edition, John Wiley and Sons Publication.

EXAMPLE 9

Preparation of the (partial) ester containing 5% of the carboxylic groups in the form of ethyl ester.

665 mg (0.75 mEq.) of the tetrabutylammonium salt of gellan are solubilized in 30 ml of DMSO at 25° C. 10.9 mg (0.07 Meq.) of ethyl iodide are added. The solution is well shaken for 16 hrs at 30° C. To transform the residue salified carboxylic groups from their tetrabutylammonium form to their tetramethylammonium form, 165 mg of tetramethylammonium chloride dissolved in 8 ml of distilled water are added.

The solution is added drop by drop to 250 ml of acetone, while being shaken. The precipitate is separated by filtration, washed three times with 20 ml of acetone, then vacuum-dried.

Yield: 470 mg.

Quantitative determination of the degree of esterification of gellan is performed by IR and NMR spectroscopy.

Quantitative determination of the ester groups is also performed by the saponification method described on pages 169–172 of "Quantitative organic analysis via functional groups", 4th Edition, John Wiley and Sons Publication.

EXAMPLE 10

Preparation of the (partial) ester containing 60% of the carboxylic groups in the form of benzyl ester.

665 mg (0.75 Meq.) of the tetrabutylammonium salt del gellano are solubilized in 30 ml of DMSO at 25° C. 0.143 g (0.84 mEq.) of benzyl bromide are added. The solution is well shaken for 16 hrs at 30° C. To transform the residue salified carboxylic groups from their tetrabutylammonium form to their tetramethylammonium form, 165 mg of tetramethylammonium chloride dissolved in 8 ml of distilled water are added.

The solution is added drop by drop to 250 ml of acetone, while being shaken. The precipitate is separated by filtration, washed three times with 20 ml of acetone, then vacuum-dried.

Yield: 460 mg.

Quantitative determination of the degree of esterification of gellan was performed by IR and NMR spectroscopy.

Quantitative determination of the ester groups is also performed by the saponification method described on pages 169-172 of "Quantitative organic analysis via functional groups", 4th Edition, John Wiley and Sons Publication.

EXAMPLE 11

Preparation of the (partial) ester containing 17% of the carboxylic groups in the form of benzyl ester.

665 mg (0.75 Meq.) of the tetrabutylammonium salt of gellan are solubilized in 30 ml of DMSO at 25° C. 41.0 mg (0.24 Meq.) of benzyl bromide are added. The solution is well shaken for 16 hrs at 30° C. To transform the residue salified carboxylic groups from their tetrabutylammonium form to their tetramethylammonium form, 165 mg of tetramethylammonium chloride dissolved in 8 ml of distilled water are added.

The solution is added drop by drop to 250 ml of acetone, while being shaken. The precipitate is separated by filtration, washed three times with 20 ml of acetone, then vacuum-dried.

Yield: 460 mg.

Quantitative determination of the degree of esterification of gellan was performed by IR and NMR spectroscopy.

Quantitative determination of the ester groups is also performed by the saponification method described on pages 169-172 of "Quantitative organic analysis via functional groups", 4th Edition, John Wiley and Sons Publication.

EXAMPLE 12

Preparation of the (partial) ester containing 10% of the carboxylic groups in the form of benzyl ester.

665 mg (0.75 mEq.) of the tetrabutylammonium salt of gellan are solubilized in 30 ml of DMSO at 25° C. 23.9 mg (0.14 mEq.) of benzyl bromide are added. The solution is well shaken for 16 hrs at 30° C. To transform the residue salified carboxylic groups from their tetrabutylammonium form to their tetramethylammonium form, 165 mg of tetramethylammonium chloride dissolved in 8 ml of distilled water are added.

The solution is added drop by drop to 250 ml of acetone, while being shaken. The precipitate is separated by filtration, washed three times with 20 ml of acetone, then vacuum-dried.

Yield: 460 mg.

Quantitative determination of the degree of esterification of gellan is performed by IR and NMR spectroscopy.

Quantitative determination of the ester groups is also performed by the saponification method described on pages 169-172 of "Quantitative organic analysis via functional groups", 4th Edition, John Wiley and Sons Publication.

EXAMPLE 13

Preparation of the (partial) ester containing 5% of the carboxylic groups in the form of benzyl ester.

665 mg (0.75 mEq.) of the tetrabutylammonium salt of gellan are solubilized in 30 ml of DMSO at 25° C. 17.0 mg (0.07 mEq.) of benzyl bromide are added. The solution is well shaken for 16 hrs at 30° C. To transform the residue salified carboxylic groups from their tetrabutylammonium form to their tetramethylammonium form, 165 mg of tetramethylammonium chloride dissolved in 8 ml of distilled water are added.

The solution is added drop by drop to 250 ml of acetone, while being shaken. The precipitate is separated by filtration, washed three times with 20 ml of acetone, then vacuum-dried.

Yield: 460 mg.

Quantitative determination of the degree of esterification of gellan is performed by IR and NMR spectroscopy.

Quantitative determination of the ester groups is also performed by the saponification method described on pages 169-172 of "Quantitative organic analysis via functional groups", 4th Edition John Wiley and Sons Publication.

EXAMPLE 14

Preparation of the (partial) ester containing 60% of the carboxylic groups in the form of isopropylic ester.

665 mg (0.75 mEq.) of the tetrabutylammonium salt of gellan are solubilized in 30 ml of DMSO at 25° C. 0.146 g (0.84 mEq.) of isopropyl iodide are added. The solution is well shaken for 16 hrs at 30° C. To transform the residue salified carboxylic groups from their tetrabutylammonium form to their tetramethylammonium form, 165 mg of tetramethylammonium chloride dissolved in 8 ml of distilled water are added.

The solution is added drop by drop to 250 ml of acetone, while being shaken. The precipitate is separated by filtration, washed three times with 20 ml of acetone, then vacuum-dried.

Yield: 460 mg.

Quantitative determination of the degree of esterification of gellan was performed by IR and NMR spectroscopy.

Quantitative determination of the ester groups is also performed by the saponification method described on pages 169-172 of "Quantitative organic analysis via functional groups", 4th Edition, John Wiley and Sons Publication.

EXAMPLE 15

Preparation of the (partial) ester containing 17% of the carboxylic groups in the form of isopropylic ester.

665 mg (0.75 mEq.) of the tetrabutylammonium salt of gellan are solubilized in 30 ml of DMSO at 25° C. 41.5 mg (0.24 mEq.) of isopropyl iodide are added. The solution is well shaken for 16 hrs at 30° C. To transform the residue salified carboxylic groups from their tetrabutylammonium form to their tetramethylammonium form, 165 mg of tetramethylammonium chloride dissolved in 8 ml of distilled water are added.

The solution is added drop by drop to 250 ml of acetone, while being shaken. The precipitate is separated by filtration, washed three times with 20 ml of acetone, then vacuum-dried.

Yield: 460 mg.

Quantitative determination of the degree of esterification of gellan was performed by IR and NMR spectroscopy.

Quantitative determination of the ester groups is also performed by the saponification method described on pages 169–172 of "Quantitative organic analysis via functional groups", 4th Edition, John Wiley and Sons Publication.

EXAMPLE 16

Preparation of the (partial) ester containing 10% of the carboxylic groups in the form of isopropylic ester.

665 mg (0.75 mEq.) of the tetrabutylammonium salt of gellan are solubilized in 30 ml of DMSO at 25° C. 24.4 mg (0.14 mEq.) of isopropyl iodide are added. The solution is well shaken for 16 hrs at 30° C. To transform the residue salified carboxylic groups from their tetrabutylammonium form to their tetramethylammonium form, 165 mg of tetramethylammonium chloride dissolved in 8 ml of distilled water are added.

The solution is added drop by drop to 250 ml of acetone, while being shaken. The precipitate is separated by filtration, washed three times with 20 ml of acetone, then vacuum-dried.

Yield: 460 mg.

Quantitative determination of the degree of esterification of gellan is performed by IR and NMR spectroscopy.

Quantitative determination of the ester groups is also performed by the saponification method described on pages 169–172 of "Quantitative organic analysis via functional groups", 4th Edition John Wiley and Sons Publication.

EXAMPLE 17

Preparation of the (partial) ester containing 5% of the carboxylic groups in the form of isopropylic ester.

665 mg (0.75 mEq.) of the tetrabutylammonium salt of gellan are solubilized in 30 ml of DMSO at 25° C. 12.2 mg (0.07 mEq.) of isopropyl iodide are added. The solution is well shaken for 16 hrs at 30° C. To transform the residue salified carboxylic groups from their tetrabutylammonium form to their tetramethylammonium form, 165 mg of tetramethylammonium chloride dissolved in 8 ml of distilled water are added.

The solution is added drop by drop to 250 ml of acetone, while being shaken. The precipitate is separated by filtration, washed three times with 20 ml of acetone, then vacuum-dried.

Yield: 460 mg.

Quantitative determination of the degree of esterification of gellan was performed by IR and NMR spectroscopy.

Quantitative determination of the ester groups is also performed by the saponification method described on pages 169–172 of "Quantitative organic analysis via functional groups", 4th Edition John Wiley and Sons Publication.

EXAMPLE 18

Preparation of the (partial) ester containing 60% of the carboxylic groups in the form of tertbutylic ester.

665 mg (0.75 mEq.) of the tetrabutylammonium salt of gellan are solubilized in 30 ml of DMSO at 25° C. 0.154 g (0.84 mEq.) of tertbutyl iodide are added. The solution is well shaken for 16 hrs at 30° C. To transform the residue salified carboxylic groups from their tetrabutylammonium form to their tetramethylammonium form, 165 mg of tetramethylammonium chloride dissolved in 8 ml of distilled water are added.

The solution is added drop by drop to 250 ml of acetone, while being shaken. The precipitate is separated by filtration, washed three times with 20 ml of acetone, then vacuum-dried.

Yield: 460 mg.

Quantitative determination of the degree of esterification of gellan was performed by IR and NMR spectroscopy.

Quantitative determination of the ester groups is also performed by the saponification method described on pages 169–172 of "Quantitative organic analysis via functional groups", 4th Edition John Wiley and Sons Publication.

EXAMPLE 19

Preparation of the (partial) ester containing 17% of the carboxylic groups in the form of tertbutylic ester.

665 mg (0.75 mEq.) of the tetrabutylammonium salt of gellan are solubilized in 30 ml of DMSO at 25° C. 44.1 mg (0.24 mEq.) of tertbutylic iodide are added. The solution is well shaken for 16 hrs at 30° C. To transform the residue salified carboxylic groups from their tetrabutylammonium form to their tetramethylammonium form, 165 mg of tetramethylammonium chloride dissolved in 8 ml of distilled water are added.

The solution is added drop by drop to 250 ml of acetone. The precipitate is separated by filtration, washed three times with 20 ml of acetone, then vacuum-dried.

Yield: 460 mg.

Quantitative determination of the degree of esterification of gellan is performed by IR and NMR spectroscopy.

Quantitative determination of the ester groups is also performed by the saponification method described on pages 169–172 of "Quantitative organic analysis via functional groups", 4th Edition, John Wiley and Sons Publication.

EXAMPLE 20

Preparation of the (partial) ester containing 10% of the carboxylic groups in the form of tertbutylic ester.

665 mg (0.75 mEq.) of the tetrabutylammonium salt of gellan are solubilized in 30 ml of DMSO at 25° C. 25.7 leg (0.14 mEq.) of tertbutyl iodide are added. The solution is well shaken for 16 hrs at 30° C. To transform the residue salified carboxylic groups from their tetrabutylammonium form to their tetramethylammonium form, 165 mg of tetramethylammonium chloride dissolved in 8 ml of distilled water are added.

The solution is added drop by drop to 250 ml of acetone, while being shaken. The precipitate is separated by filtration, washed three times with 20 ml of acetone, then vacuum-dried.

Yield: 460 mg.

Quantitative determination of the degree of esterification of gellan is performed by IR and NMR spectroscopy.

Quantitative determination of the ester groups is also performed by the saponification method described on pages 169–172 of "Quantitative organic analysis via functional groups", 4th Edition John Wiley and Sons Publication.

EXAMPLE 21

Preparation of the (partial) ester containing 5% of the carboxylic groups in the form of tertbutylic ester.

665 mg (0.75 mEq.) of the tetrabutylammonium salt of gellan are solubilized in 30 ml of DMSO at 25° C. 12.9 mg (0.07 mEq.) of tertbutyl iodide are added. The solution is well shaken for 16 hrs at 30° C. To transform the residue salified carboxylic groups from their tetrabutylammonium form to their tetramethylammonium form, 165 mg of tetramethylammonium chloride dissolved in 8 ml of distilled water are added.

The solution is added drop by drop to 250 ml of acetone, while being shaken. The precipitate is separated by filtration, washed three times with 20 ml of acetone, then vacuum-dried.

Yield: 460 mg.

Quantitative determination of the degree of esterification of gellan is performed by IR and NMR spectroscopy.

Quantitative determination of the ester groups is also performed by the saponification method described on pages 169-172 of "Quantitative organic analysis via functional groups", 4th Edition, John Wiley and Sons Publication.

EXAMPLE 22

Preparation of the methyl ester of gellan.

8.35 g (9.4 m.Eq.) of the tetrabutylammonium salt of gellan are solubilized in 400 ml of DMSO at 25° C. 1.67 g (11.8 m.Eq.) of methyl iodide are added. The solution is well shaken for 12 hrs at 30° C., and then poured drop by drop into 3.5 l of ethyl (or toluene) acetate, while being shaken. The precipitate is filtered and washed four times with ethyl acetate and vacuum-dried for 24 hrs at 30° C. 5.5 g of the compound named in the title are thus obtained.

Quantitative determination of the ester groups is also performed by the saponification method described on pages 169-172 of "Quantitative organic analysis via functional groups", 4th Edition, John Wiley and Sons Publication.

EXAMPLE 23

Preparation of the benzyl ester of gellan.

10 g (11.3 m.Eq.) of the tetrabutylammonium salt of gellan are solubilized in 400 ml of DMSO at 25° C. 2.4 g (14.1 m.Eq.) of benzyl bromide and 0.1 g of tetrabutylammonium iodide are added.

The solution is well shaken for 12 hrs at 30° C., and then poured drop by drop into 3.5 l of ethyl (or toluene) acetate, while being shaken. The precipitate is filtered and washed four times with ethyl acetate and vacuum-dried for 24 hrs at 30° C. 7.5 g of the compound named in the title are thus obtained.

Quantitative determination of the ester groups is also performed by the saponification method described on pages 169-172 of "Quantitative organic analysis via functional groups", 4th Edition John Wiley and Sons Publication.

EXAMPLE 24

Preparation of the tertbutyl ester of gellan.

10 g (11.3 m.Eq.) of the tetrabutylammonium salt of gellan are solubilized in 400 ml of DMSO at 25° C. 2.5 g (14.1 m.Eq.) of tertbutyl iodide are added.

The solution is well shaken for 12 hrs at 30° C., and then poured drop by drop into in 3,5 l of ethyl (or toluene) acetate, while being shaken. The precipitate is filtered and washed four times with ethyl acetate and vacuum-dried for 24 hrs at 30° C. 7.0 g of the compound named in the title are thus obtained.

Quantitative determination of the ester groups is also performed by the saponification method described on pages 169-172 of "Quantitative organic analysis via functional groups", 4th Edition John Wiley and Sons Publication.

EXAMPLE 25

Preparation of the isopropylic ester of gellan.

10 g (11.3 m.Eq.) of the tetrabutylammonium salt of gellan are solubilized in 400 ml of DMSO at 25° C. 2.4 g (14.1 m.Eq.) of isopropyl iodide are added.

The solution is well shaken for 12 hrs at 30° C., and then poured drop by drop into 3.5 l of ethyl (or toluene) acetate, while being shaken. The precipitate is filtered and washed four times with ethyl acetate and vacuum-dried for 24 hrs at 30° C. 6.8 g of the compound named in the title are thus obtained.

Quantitative determination of the ester groups is also performed by the saponification method described on pages 169-172 of "Quantitative organic analysis via functional groups", 4th Edition, John Wiley and Sons Publication.

EXAMPLE 26

Preparation of the ethyl ester of gellan.

10 g (11.3 m.Eq.) of the tetrabutylammonium salt of gellan are solubilized in 400 ml of DMSO at 25° C. 2.2 g (14.1 m.Eq.) of ethyl iodide are added.

The solution is well shaken for 12 hrs at 30° C., and then poured drop by drop into 3.5 l of ethyl (or toluene) acetate, while being shaken. The precipitate is filtered and washed four times with ethyl acetate and vacuum-dried for 24 hrs at 30° C. 7.0 g of the compound named in the title are thus obtained.

Quantitative determination of the ester groups is also performed by the saponification method described on pages 169-172 of "Quantitative organic analysis via functional groups", 4th Edition John Wiley and Sons Publication.

EXAMPLE 27

Preparation of the ester of gellan containing carboxylic groups in the form of methylprednisolone ester (C-21).

890 mg (1 mEq.) of the tetrabutylammonium salt of gellan are solubilized in 40 ml of DMSO at 25° C. 560 mg (1.25 mEq.) of 21-bromo-methylprednisolone are added.

The solution is well shaken for 24 hrs at 30° C. The solution is added drop by drop to 300 ml of acetone, while being shaken. The precipitate is separated by filtration, washed three times with 30 ml of acetone, then vacuum-dried.

Quantitative determination of the methylprednisolone is performed after mild alkaline hydrolysis with a hydroalcoholic solution of sodium carbonate and extraction with chloroform, according to the British Pharmacopea, 1980, p. 224.

EXAMPLE 28

Non-woven tissue made of the benzyl ester of gellan.

An unwoven tissue with a specific weight of 200 gr/m$^2$ and a thickness of 1.5 mm, composed of the benzyl ester of gellan.

Fibres of gellan benzyl ester, 3 mm in length, obtained by a spinning process, were mixed in a suitable "screw-hopper" to obtain a fine mixture.

The mixture of fibres was loaded into a "carding machine" from which it emerged in sheet form with a specific weight of 200 gr/m² and thickness of 1.8 mm.

The sheet was treated with a "needle punch machine" and emerged as as unwoven tissue with a specific weight of 200 gr/m² and thickness of 1.5 mm, wherein the two materials were perfectly blended with each other.

EXAMPLE 29

Microspheres of the benzylic ester of gellan.

A gellan ester where all the carboxy groups of the polymer are esterified with benzyl alcohol is dissolved in an aprotic solvent such as dimethylsulfoxide, at a concentration varying from 0.5 to 5% weight/volume, generally 2% w/v. The solution obtained will be referred to hereafter as the discontinuous phase. At this time, a mixture is prepared in a suitable reactor of high-viscosity mineral oil containing Arlacel ®, a non-ionic surface-active agent, at a concentration of 1% w/v.

This mixture will be referred to hereafter as the continuous phase. It is kept at a temperature of 25° C. and stirred at a rate of 1000 RPM, while the discontinuous phase, prepared as previously described, is added to it.

In these conditions, emulsification of the two phases is instantaneous. The ratio between the two phases (discontinuous and continuous) is about 1 to 16.

After stirring for 15 minutes, ethyl acetate is added. This solvent can be mixed perfectly with the two emulsion phases, but it is not a solvent for the polymer. It has been proven that the volume of extracting solvent needed to obtain complete extraction of the total volume of the emulsion, in order to obtain complete extraction. To facilitate extraction, the stirring speed is set at 1400–1500 RPM for 10 minutes, then lowered to 500 RPM. The suspension thus obtained continues to be stirred, while being pumped by a screw pump through a filter press set at 1 atmosphere. Once this filtration is complete, it is pumped through a filter of normal-hexane, this being a solvent with the double action of "drying" the preparation and solubilizing any residue surfactant which may be present on the surface of the microspheres. The product is then put in suitable containers and stored at 4° C.

The mean particle size is 10 um. The molecular weight of the polymer which constitutes the microspheres is about 500.000–800.000.

EXAMPLE 30

Microspheres of the benzyl ester of gellan.

A gellan ester where 60% of the carboxy groups of the polymer are esterified with benzyl alcohol is dissolved in an aprotic solvent such as dimethylsulfoxide, at a concentration varying from 0.5 to 5% weight/volume, generally 2% w/v. The solution obtained will be referred to hereafter as the discontinuous phase. At this time, a mixture is prepared in a suitable reactor of high-viscosity mineral oil containing Arlacel ®, a non-ionic surface-active agent, at a concentration of 1% w/v.

This mixture will be referred to hereafter as the continuous phase. It is kept at a temperature of 25° C. and stirred at a rate of 1000 RPM, while the discontinuous phase, prepared as previously described, is added to it.

In these conditions, emulsification of the two phases is instantaneous. The ratio between the two phases (discontinuous and continuous) is about 1 to 16.

After stirring for 15 minutes, ethyl acetate is added. This solvent can be mixed perfectly with the two emulsion phases, but it is not a solvent for the polymer. It has been proven that the volume of extracting solvent needed to obtain complete extraction of the total volume of the emulsion, in order to obtain complete extraction. To facilitate extraction, the stirring speed is set at 1400–1500 RPM for 10 minutes, then lowered to 500 RPM. The suspension thus obtained continues to be stirred, while being pumped by a screw pump through a filter press set at 1 atmosphere. Once this filtration is complete, it is pumped through a filter of normal-hexane, this being a solvent with the double action of "drying" the preparation and solubilizing any residue surfactant which may be present on the surface of the microspheres. The product is then put in suitable containers and stored at 4° C.

The mean particle size is 10 um. The molecular weight of the polymer which constitutes the microspheres is about 500,000–800,000.

The following is claimed:

1. A partial ester of gellan in which gellan is esterified with an araliphatic alcohol having one benzene residue and an aliphatic chain of from 1 to 4 carbon atoms and wherein the benzene residue can be substituted by 1-3 substituents selected from the group consisting of methyl, methoxy, hydroxy and a halogen atom, and wherein the aliphatic chain can be substituted by one or two groups selected from the group consisting of free or mono- or diethylated amino groups, a pyrrolidine and a piperidine group, or a salt thereof with alkali metals, alkaline earth metals, ammonium, aluminum or organic bases.

2. The partial ester of gellan or a salt thereof according to claim 1, wherein the alcohol is selected from the group consisting of benzyl alcohol, phenethyl alcohol, ephedrine and adrenalin.

3. The partial ester of gellan according to claim 1 in which 17% of the carboxy groups are esterified with benzyl alcohol.

* * * * *